(12) United States Patent
Yamada et al.

(10) Patent No.: US 7,527,819 B2
(45) Date of Patent: May 5, 2009

(54) PACKAGED TEA DRINK

(75) Inventors: Yasushi Yamada, Tokyo (JP); Chitoshi Shigeno, Tokyo (JP)

(73) Assignee: Kao Corporation, Tokyo (JP)

( * ) Notice: Subject to any disclaimer, the term of this patent is extended or adjusted under 35 U.S.C. 154(b) by 714 days.

(21) Appl. No.: 10/505,088

(22) PCT Filed: Dec. 17, 2003

(86) PCT No.: PCT/JP03/16181

§ 371 (c)(1),
(2), (4) Date: Mar. 8, 2005

(87) PCT Pub. No.: WO2004/057974

PCT Pub. Date: Jul. 15, 2004

(65) Prior Publication Data

US 2005/0163889 A1     Jul. 28, 2005

(30) Foreign Application Priority Data

Dec. 24, 2002  (JP) ............................. 2002-372318
Jan. 23, 2003  (JP) ............................. 2003-014302
Sep. 19, 2003  (JP) ............................. 2003-327197

(51) Int. Cl.
*A23F 3/00* (2006.01)
(52) U.S. Cl. .................. 426/597; 426/435; 426/422; 426/423
(58) Field of Classification Search .............. 426/597, 426/435, 422, 423
See application file for complete search history.

(56) References Cited

U.S. PATENT DOCUMENTS

| | | | |
|---|---|---|---|
| 5,863,581 A * | 1/1999 | Barrett et al. ............... | 426/250 |
| 6,268,009 B1 * | 7/2001 | Ekanayake et al. ........... | 426/597 |
| 2003/0185950 A1 * | 10/2003 | Niino et al. .................. | 426/435 |
| 2005/0084566 A1 * | 4/2005 | Bavan ......................... | 426/49 |
| 2005/0163889 A1 | 7/2005 | Yamada et al. | |
| 2008/0292767 A1 | 11/2008 | Iwasaki et al. | |
| 2008/0292772 A1 | 11/2008 | Iwasaki et al. | |

FOREIGN PATENT DOCUMENTS

| | | |
|---|---|---|
| EP | 0 847 697 A1 | 6/1998 |
| EP | 1 297 757 A1 | 4/2003 |
| JP | 02-291230 | 12/1990 |
| JP | 4-45744 | 2/1992 |
| JP | 5-328901 | 12/1993 |
| JP | 11-504224 | 4/1999 |
| JP | 11-228565 | 8/1999 |
| JP | 11-292870 | 10/1999 |
| JP | 11-308965 | 11/1999 |
| JP | 2003-259806 | 9/2003 |
| WO | 97/30597 | 8/1997 |
| WO | 02/39822 A2 | 5/2002 |
| WO | 02/065846 A1 | 8/2002 |

OTHER PUBLICATIONS

Patent Abstracts of Japan, JP 06 343389, Dec. 20, 1994.

* cited by examiner

*Primary Examiner*—Anthony Weier
(74) *Attorney, Agent, or Firm*—Oblon, Spivak, McClelland, Maier & Neustadt, P.C.

(57) ABSTRACT

This invention relates to packaged tea beverages, which contain the following ingredients: (A) from 0.05 to 0.5 wt. % of non-polymer catechins, (B) magnesium, and (C) water-insoluble solid particles sized from 0.2 to 0.8 μm. The contents of the ingredient (B) and ingredient (C) fall within specific ranges. These tea beverages contain non-polymer catechins at high concentration, are free from the formation of grouts or precipitates even when stored over a long term, and have a refined taste.

12 Claims, No Drawings

PACKAGED TEA DRINK

TECHNICAL FIELD

This invention relates to packaged tea beverages containing non-polymer catechins at high concentration.

BACKGROUND ART

As effects of catechins, there have been reported a suppressing effect on the increase in cholesterol level and an inhibitory effect on α-amylase activities. For such physiological effects to emerge, an adult is required to drink 4 to 5 cups of tea in a day. Accordingly, there has been a demand for the technology enabling catechins to be contained in a beverage at a high concentration so that a large amount of catechins can be ingested conveniently. As one of the methods for this, catechins of a dissolved form prepared from a concentrate, purified product or the like of a green tea extract can be added to a beverage.

However, a beverage with a concentrate or purified product of a green tea extract added therein tends to develop grouts and precipitates when stored for a long time after its production, and consequently largely damages its external appearance. Conventional tea beverages, especially green tea beverages, may also develop grouts and precipitates during storage, but in the case of beverages with a concentrate or purified product of a green tea extract added therein, their external appearance severely deteriorates. The grouts and precipitates in green tea beverages are considered to be caused by the formation of complexes from components such as polysaccharides, proteins, polyphenols, metal ions and the like. The mechanisms of formation of grouts and precipitates are complex, and a variety of countermeasures have been considered to date. As countermeasures focused on high-molecular components in green tea, there have been methods for suppressing the formation of grouts by causing components of a high molecular complex to be disintegrated into lower molecular weight substances by enzymatic treatment (JP-A-05-328901, JP-A-11-308965); and a method for suppressing the formation of grouts by fractionating green tea components through an ultrafiltration membrane to substantially eliminate high molecular substances whose molecular weights are 10,000 and higher (JP-A-04-045744). As a countermeasure focused on metal ions, on the other hand, there has been a method for reducing a light blue color and turbidity by a treatment with a cation exchange resin, followed by nanofiltration (JP-A-11-504224).

DISCLOSURE OF THE INVENTION

The present invention relates to a packaged tea beverage containing the following ingredients:

(A) from 0.05 to 0.5 wt. % of non-polymer catechins,
(B) magnesium, and
(C) water-insoluble solid particles sized from 0.2 to 0.8 μm, and satisfying the following inequality (1):

$$20 < (C) \leq -13 \times (B) + 140 \quad (1)$$

wherein (B) and (C) indicate contents (mg/L) of the ingredient (B) and ingredient (C), respectively.

The present invention also relates to a process for producing a tea extract by mixing an extract of a tea material selected from green tea, semi-fermented tea or fermented tea with a concentrate or purified product of a green tea extract, and the process is characterized by bringing one or a mixture of the extract and the concentrate or purified product into contact with a gel-type cation exchange resin such that the content of non-polymer catechins is from 0.05 to 1.5 wt. % and the following inequality (3) is satisfied:

$$20 < (C1) \leq -7.8 \times (B1) + 195 \quad (3)$$

wherein (B1) indicates a concentration of magnesium [mg/L] and (C1) indicates an amount [mg/L] of water-insoluble solid particles sized from 0.2 to 0.8 μm that are derived from the tea material.

DETAILED DESCRIPTION OF THE INVENTION

The conventional countermeasures are, however, accompanied by one or more drawbacks. For instance, the method aimed at eliminating most of the high molecular components by ultrafiltration or nanofiltration is prone to discard the majority of tasty components of the tea simultaneously, so that the formation of grouts and precipitates are suppressed at the expense of flavor and taste specific to tea. When an enzymatic treatment is applied, on the other hand, the peculiar flavor and taste of tea may be degraded by the taste of the enzyme itself.

The present invention, therefore, relates to a packaged tea beverage containing a high concentration of non-polymer catechins which does not form grouts and precipitates but maintains a refined taste over long term storage.

The present inventors have made various investigations with the aim of suppressing the formation of grouts and precipitates in such a packaged tea beverage during long term storage. As a result, it has been found that controlling the concentration of magnesium and the amount of water-insoluble solid particles sized from 0.2 to 0.8 μm makes it possible to obtain, without an impairment to the peculiar flavor and taste of tea, a beverage which does not develop grouts and precipitates during long term storage. In addition, it has also been found that the treatment with a cation exchange resin, particularly a gel-type cation exchange resin, can efficiently control the concentration of magnesium.

The beverage according to the present invention contains non-polymer catechins at a high concentration, is free from the formation of grouts and precipitates when stored for a long time, provides a refined taste as well as a refreshing feeling, and is suited for habitual drinking.

The term "non-polymer catechins (A)" used herein is a generic term encompassing non-epicatechins such as catechin, gallocatechin, catechingallate, gallocatechin gallate and the like, and epicatechins such as epicatechin, epigallocatechin, epicatechin gallate, epigallocatechin gallate and the like. The term "concentration of non-polymer catechins" used herein is defined on the basis the total amount of the above-described eight types of catechins.

The packaged tea beverage according to the present invention contains from 0.05 to 0.5 wt. % of the non-polymer catechins (A), which are non-polymers and in water-dissolved forms. However, the content of the non-polymer catechins (A) may be preferably from 0.06 to 0.5 wt. %, more preferably from 0.07 to 0.45 wt. %, even more preferably from 0.08 to 0.45 wt. %, still more preferably from 0.092 to 0.4 wt. %, still more preferably from 0.11 to 0.3 wt. %, yet still more preferably from 0.12 to 0.3 wt. %. When the content of the non-polymer catechins falls within the above-described ranges, a large amount of the non-polymer catechins can be ingested easily, and the non-polymer catechins tend to be effectively absorbed into the body without producing strong bitterness and astringency. The concentration of the non-polymer catechins can be adjusted depending on the amount of the concentrate or purified product of the green tea extract to be added.

From the standpoint of suppressing a change in hue during storage, the weight ratio of the non-epicatechins (A1) to the epi-catechins (A2) in the packaged tea beverage according to the present invention [(A1)/(A2)] may be preferably from 0.54 to 9.0, more preferably from 0.55 to 9.0, even more preferably from 0.67 to 9.0, still more preferably from 0.73 to 9.0, yet still more preferably from 1.0 to 9.0.

It is preferred that within the non-polymer catechins the ratio of the gallocatechins consisting of epigallocatechin gallate, gallocatechin gallate, epigallocatechin and gallocatechin to the nongallocatechins consisting of epicatechin gallate, catechingallate, epicatechin and catechin remain no difference from the composition in natural green tea leaves in the packaged tea beverage of the present invention. From the standpoint of retaining the catechin composition of natural green tea leaves in the beverage, it is preferred that the total amount of the four types of gallocatechins be always greater than that of the four types of nongallocatechins.

The proportion of the gallates consisting of catechingallate, epicatechin gallate, gallocatechin gallate and epigallocatechin gallate in the entire non-polymer catechins in the packaged tea beverage according to the present invention may preferably be 45 wt. % or greater from the standpoint of the effectiveness of the physiological effects of the non-polymer catechins.

It is preferred to control the concentration of the magnesium (B) in the packaged tea beverage according to the present invention to from 0 to 9.2 mg/L, with from 0 to 5 mg/L being more preferred and with from 0 to 2 mg/L being still more preferred. As a method for lowering the concentration of magnesium, one or a mixture of an extract of tea as a raw material and a purified product of green tea extract can be treated with a cation exchange resin. The cation exchange resins that are used in this method are resins which contain sulfonic groups, carboxyl groups, phosphate groups or the like. Specific examples include, but are not limited to, chelate resins and the like such as the SK series led by "Diaion SK-1B" and the PK series led by "Diaion PK-208" (products of Mitsubishi Chemicals Corporation), the #100 series led by "Amberlite IR-116" (products of Rohm and Haas Company), the W series led by "Dowex 50W-X1" (product of Dow Chemicals Company), and "Diaion CR-10" (product of Mitsubishi Chemicals Corporation). Of these, the gel-type cation exchange resins are preferred.

The contact of the raw material or the mixture with the cation exchange resin can be carried out batchwise, semi-batchwise, semi-continuously, or continuously, although it is preferred to allow the raw material or the mixture to continuously pass through the column packed with the resin. If the concentration of magnesium in the beverage is higher than 9.2 mg/L, grouts and precipitates may be formed during long term storage even if the amount of water-insoluble solids sized from 0.2 to 0.8 μm is controlled in low amounts.

The expression "(C) water-insoluble solid particles sized from 0.2 to 0.8 μm" used herein indicates solids, which have remained on a 0.2 μm membrane filter (e.g., "Omnipore", product of Millipore Corporation) after filtration of the beverage through a membrane filter of 0.8 μm pore size (e.g., the cellulose-mixed ester type, product of Toyo Filter Paper Corporation) followed by filtration through the 0.2 μm membrane filter under suction. By measuring the oven-dried weight of the solids, the content of the solids in the beverage is calculated. These water-insoluble solids are formed of polysaccharides, proteins, polyphenol, metal ions and the like. As an illustrative method for lowering the content of water-insoluble solids, a suitable concentrate or purified product of a green tea extract can be chosen from those available on the market, or the thus-chosen concentrate or purified product can be subjected to repurification. It is also possible to apply filtration with a conventional cartridge filter in the course of the production of the beverage. Examples of the filter that can be used include those employed on an industrial scale, such as the Zeta Plus series (products of Cuno Corporation), the Profile II series (products of Nihon Pall Ltd.) and the like. It is unnecessary to remove a substantial amount of water-insoluble solids with any special membrane such as an ultrafiltration membrane (UF), microfiltration membrane (MF) or the like. The concentration of the water-insoluble solids in the beverage according to the present invention may preferably be higher than 20 mg/L. Any attempt to lower the contents of water-insoluble solid particles sized from 0.2 to 0.8 μm to 20 mg/L or less requires such a special membrane, leading to a significant reduction in the productivity of the beverage. Further, the components which make up the water-insoluble solids are taste components in tea, so that lowering the concentration of the water-insoluble solids to 20 mg/L or less leaves a feeling of strong bitterness and astringency upon drinking, and the beverage becomes disagreeable for habitual drinking.

Both ingredient (B) and ingredient (C) take part in the formation of grouts and precipitates, so that the formation of grouts and precipitates can be more effectively suppressed when the contents of both of them are lowered rather than when the content of only one of them is lowered. To avoid impairment to the flavor and taste of the beverage, the content of ingredient (C) needs to be greater than a specific amount.

With the foregoing in view, it is preferred to control the contents (mg/L) of ingredient (B) and ingredient (C) to satisfy the following inequality (1):

$$20<(C)<-13\times(B)+140 \quad (1)$$

preferably, the following inequality (2):

$$20<(C)<-8.7\times(B)+100 \quad (2)$$

If the relationship between ingredient (B) and ingredient (C) fails to satisfy the above-described inequality, grouts and precipitates are formed during long term storage.

From the standpoint of chemical stability of the non-polymer catechins, it is preferred to control pH of the packaged tea beverage according to the present invention to a range of 2 to 7, more preferably 3 to 7, still more preferably 5 to 7, all at 25° C.

It is preferred to produce the packaged tea beverage according to the present invention by applying such cation exchange resin treatment or filtration treatment as described above as needed and adding the extract of the tea material and the concentrate or purified product of the green tea extract.

Examples of the concentrate or purified product of the green tea extract include "Polyphenon" (product of Mitsui Norin Co., Ltd.), "TEAFURAN" (product of ITO EN, LTD.) and "SUNPHENON" (product of Taiyo Kagaku Co., Ltd.), all of which are available commercially. They can also be used after repurification. An example of a repurification method is as follows: a concentrate of a green tea extract is suspended in water or a mixture of water and an organic solvent. To the suspension an organic solvent is added, and the resulting precipitates are removed, and then, the solvent is distilled off. Alternatively, an extract obtained from tea leaves with hot water or a water-soluble organic solvent is concentrated and then purified further, or the extract so obtained is directly purified. The concentrate or purified product of the green tea extract mentioned above may appear in various forms such as a solid, an aqueous solution, a slurry and the like.

The extract of the tea material, which is employed in the packaged tea beverage according to the present invention, can be an extract of tea selected from green tea, semi-fermented tea or fermented tea, or a non-tea beverage. Preferred is a beverage that is an extract of a tea material with the product purified by the above-described process added thereto, and more preferred is a green tea beverage that is an extract of green tea with the product purified by the above-described process added thereto. Illustrative of the semi-fermented tea is oolong tea, and illustrative of the fermented tea is black tea. Examples of non-tea beverages include carbonated beverages as soft drinks, beverages with fruit extract or extracts, juices with vegetable extract or extracts, near waters, sports drinks, diet drinks and the like.

Examples of green tea for use in the present invention include tea leaves prepared from tea leaves of the Genus *Camellia*, for example, *C. sinensis*, *C. assamica* and the *Yabukita* variety, or their hybrids. The prepared tea leaves are green teas such as *sencha* (middle-grade green tea), *bancha* (coarse green tea), *gyokuro* (shaded green tea), *tencha* (powdered tea), *kamairicha* (roasted tea) and the like.

It is particularly preferred to produce the packaged tea beverage according to the present invention by adding a tea extract obtained by the below-described process.

That is to say, the process for the production of the tea extract includes mixing an extract of a tea material selected from green tea, semi-fermented tea or fermented tea with a concentrate or purified product of a green tea extract. The process is characterized by bringing one or a mixture of the extract and the concentrate or purified product into contact with a gel-type cation exchange resin such that a content of non-polymer catechins is from 0.05 to 1.5 wt. % and the following inequality (3) is satisfied:

$$20 < (C1) < -7.8 \times (B1) + 195 \qquad (1)$$

wherein (B1) indicates a concentration of magnesium [mg/L] and (C1) indicates an amount [mg/L] of water-insoluble solid particles sized from 0.2 to 0.8 μm which is derived from the tea material.

Ion exchange resins include gel-type resins having a gel structure and porous or high porous resins containing a number of pores in their matrices. In the present invention, it is preferred to bring one or a mixture of an extract of a tea material and a concentrate or purified product of a green tea extract into contact with a gel-type cation exchange resin. Preferred gel-type cation exchange resin described here is a cation exchange resin which contains sulfonic groups. Specific examples include, but are not limited to, the SK series led by "Diaion SK-1B". Use of a porous or high porous cation exchange resin significantly reduces the productivity due to the adsorption of the non-polymer catechins on the resin, moreover, subsequent washing with water does not improve the yield. Use of a gel-type cation exchange resin, on the other hand, is substantially free from a loss of the non-polymer catechins. The expression "yield of the non-polymer catechins in an ion exchanging step" used herein is a ratio of (a), the amount [mg] of catechins contained in the solution after the resin treatment, and (b), the amount [mg] of catechins contained in the wash obtained by washing the resin with deionized water, to (c), the amount of catechins in the solution before the resin treatment, and is represented by the following formula (2):

$$\text{Yield [\%]} = (a+b)/c \times 100 \qquad (2)$$

As the gel-type ion exchange resin, either one containing $Na^+$ as counter ions or one containing $H^+$ as counter ions is usable. When the gel-type $H^+$ cation exchange resin is used, however, the pH of the solution after the treatment drops and bitterness of the extract is increased upon adjustment of pH with sodium bicarbonate or the like. From the standpoint of the flavor and taste of the extract, it is preferred to use the gel-type $Na^+$ cation exchange resin.

The contact of such raw material with the gel-type cation exchange resin can be carried out batchwise, semi-batchwise, semi-continuously, or continuously, although it is preferred to allow the raw material to continuously pass through the column packed with the resin. The preferred amount of the resin to be used is in a range from 0.05 to 3 wt. %, within which a range from 0.5 to 2 wt. % being more preferred, based on the extract of the tea material, the concentrate or purified product or the mixture thereof.

By the treatment with the gel-type cation exchange resin, the amount of magnesium is pronouncedly lowered (to 1.0 mg/L or less), and at the same time, the refined taste is improved owing to an increase in Na ions and a decrease in K ions without no substantial reduction in the concentration of the non-polymer catechins. The target tea extract according to the present invention contains the non-polymer catechins, which are not polymers and are in a dissolved form in water, in an amount of from 0.05 to 1.5 wt. %, preferably from 0.06 to 1.5 wt. %, more preferably from 0.07 to 1.5 wt. %, even more preferably from 0.08 to 1.5 wt. %, still more preferably from 0.092 to 1.2 wt. %, still more preferably from 0.11 to 0.9 wt. %, yet still more preferably from 0.12 to 0.9 wt. %. Insofar as the content of the non-polymer catechins in the tea extract falls within this range, it is possible to efficiently produce a beverage which facilitates the ingestion of a large amount of the non-polymer catechins, has good in vivo absorption, and does not produce strong bitterness or astringency. The concentration of the non-polymer catechins can be controlled depending on the amount of the concentrate or purified product of the green tea extract to be added.

On the other hand, the water-insoluble solids are preferred to be prepared by filtration as described above.

Upon obtaining the packaged tea beverage according to the present invention by using the tea extract obtained in the above-described manner, it is preferred to perform dilutions as needed so that the content of the non-polymer catechins falls within the above-described range.

It is possible to add, in combination with the ingredients derived from tea, additives such as antioxidants, flavors, various esters, organic acids, organic acid salts, inorganic acids, inorganic salts, colorants, emulsifiers, preservatives, seasoning agents, sweeteners, sour seasonings, fruit extracts, vegetable extracts, flower honey extracts, pH regulators and quality stabilizers—either singly or in combination—to the packaged tea beverage according to the present invention as ingredients which can be added in light of the formulation.

Examples of the sweeteners include sugar, glucose, fructose, isomerized syrup, glycyrrhizin, stevia, aspartame, fructooligosaccharide, galactooligosaccharide and the like. Examples of the sour flavors include, citric acid, tartaric acid, malic acid, lactic acid, fumaric acid, and phosphoric acid in addition to fruit juices and the like extracted from natural sources. These sour flavors described here may be contained preferably in an amount of from 0.01 to 0.5 wt. %, within which a range from 0.01 to 0.3 wt. % being more preferred, in the packaged tea beverage according to the present invention. Examples of the inorganic acids and inorganic acid salts include phosphoric acid, disodium phosphate, sodium metaphosphate, and sodium polyphosphate. These inorganic acids and inorganic acid salts may be contained preferably in an amount of from 0.01 to 0.5 wt. %, within which a range from 0.01 to 0.3 wt. % being more preferred, in the packaged tea beverage according to the present invention.

Similar to general beverages, a container used for the packaged tea beverage according to the present invention can be provided in an ordinary form such as a molded container made of polyethylene terephthalate as a principal component (so-called PET bottles), a metal can, a paper container combined with metal foils or plastic films, or a bottle. The term "packaged tea beverage" used herein means a tea beverage which can be drunk without dilution.

The packaged tea beverage according to the present invention can be produced, for example, by filling the tea beverage in a container such as a metal can which is then subjected to heat sterilization under sterilization conditions prescribed in the Food Sanitation Act, when it is feasible. For those which cannot be subjected to retort-type sterilization like PET bottles or paper containers, a process is adopted such that the tea beverage is sterilized beforehand under similar sterilization conditions as those described above, for example, by a plate-type heat exchanger, is cooled to a particular temperature, and is then filled in a container. Under aseptic conditions, additional ingredients may be added to and filled in a filled container. It is also possible to restore the pH of the tea beverage to neutral in an aseptic environment subsequent to heat sterilization under acidic conditions, or to restore the pH of the tea beverage to acidic in an aseptic environment subsequent to heat sterilization under neutral conditions.

EXAMPLES

Measurement of Catechins

A packaged beverage, which had been filtrated through a filter (0.8 μm) and then diluted with distilled water, was subjected to a gradient elution using a high-performance liquid chromatograph (model: SCL-10Avp), manufactured by Shimadzu Corporation, fitted with an LC column packed with octadecyl-introduced silica gel, "L-Column, TM ODS" (4.6 mm in diameter×250 mm in length; product of Chemicals Evaluation and Research Institute, Japan) at the column temperature of 35° C. A 0.1 mol/L solution of acetic acid in distilled water and a 0.1 mol/L solution of acetic acid in acetonitrile were fed as mobile phase solution A and mobile phase solution B, respectively, at flow rates of 1.0 mL/min. The gradient conditions were set as follows:

| Time | Solution A | Solution B |
| --- | --- | --- |
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |

The measurement was conducted under the following conditions:
Injected sample quantity: 10 μL
UV detector wavelength: 280 nm Measurement of the Concentration of Magnesium The ICP emission spectroscopy was followed. "SP-1200A" (manufactured by Seiko Instruments Inc.) was used.

Measurement of the Content of Water-insoluble Solid Particles Sized from 0.2 to 0.8 μm A beverage (100 g), which had been filtrated through a cellulose-mixed ester type membrane filter having 0.8 μm pore size ("ADVANTEC", product of Toyo Filter Paper Corporation), was filtrated under suction through an "Omnipore membrane filter" having 0.2 μm pore size (manufactured by Millipore Corporation), and the content of water-insoluble solids was calculated from a difference between an initial weight of the oven-dried filter and the weight of the same filter oven-dried after the filtration. The constant weight of the filter was determined by drying it at 105° C. for 3 hours and then allowing it to cool down for 1 hour in a desiccator at room temperature.

Evaluation of Grouts and Precipitates During Storage

The evaluation was done based on an accelerated storage test. Each packaged tea beverage was stored in an incubator at 55° C., and 5 days later, its outer appearance was visually evaluated.

Evaluation of grouts and precipitates:
−: Neither grouts nor precipitates were formed.
±: Small grouts were slightly formed but immediately disappeared when the beverage in the container was caused to move.
+: Small grouts and precipitates were formed a little.
++: Large grouts and precipitates were formed abundantly.
Evaluation on refined taste:
A: Excellent.
B: Poor.

Example 1

Green tea leaves (135 g) from Miyazaki were added to deionized water (4 kg) which had been heated to 65° C., followed by extraction for 5 minutes. The tea leaves were then removed from the extract, and the extract was cooled to 25° C. or lower by a heat exchanger. By flannel filtration, precipitates and suspended matters were then removed from the extract. The extract was then allowed to pass through a column packed with a cation exchange resin ("Diaion SK-1B") at room temperature. The amount of the resin was set at 0.2 wt. % based on the final beverage product. Subsequently, the extract was filtrated through a disc-shaped depth filter ("Zeta Plus 10C"). On the other hand, a commercially-available concentrate (100 g; "Polyphenon HG", product of Mitsui Norin Co., Ltd.) of a green tea extract was dispersed in 99.5 wt. % ethanol (630 g), to which water (270 g) was added dropwise over 10 minutes subsequently. The resulting mixture was allowed to age for 30 minutes. The mixture was filtrated through No. 2 filter paper and a filter paper having 0.2 μm pore size, and water (200 mL) was added. The thus-prepared mixture was concentrated under reduced pressure and then lyophilized to obtain a repurified product. To the above-obtained extract (2,900 g), the repurified product was added such that the concentration of the non-polymer catechins is 0.18 wt. % in the final product. After adjusting pH to 6.4 with sodium hydrogencarbonate, the mixture was diluted to 8,000 g. Subsequent to UHT sterilization, it was filled in PET bottles. The results of an analysis and evaluation on grouts, precipitates and refined taste of the beverage are shown in Table 1.

Example 2

A flannel filtrate of a green tea extract was obtained under the same conditions as in Example 1. To the flannel filtrate (2,900 g), a repurified product of a commercially-available concentrate of a green tea extract obtained under conditions similar to that described in Example 1 was added such that the concentration of the non-polymer catechins is 0.18 wt. % in the final product. The resulting mixture was allowed to pass through a column packed with a cation exchange resin ("Dialon SK-1B") at room temperature. The amount of the resin was set at 0.5 wt. % based on the final beverage product. The thus-obtained solution was filtrated through a disc-shaped depth filter ("Zeta Plus 10C"). Subsequent to dilution, the pH of the solution was adjusted to 6.4 with sodium hydrogencarbonate, and it was diluted further to 8,000 g. Subsequent to UHT sterilization, the resulting solution was filled in PET bottles. The results of an analysis and evaluation on grouts, precipitates and refined taste of the beverage are shown in Table.

Example 3

Under the same conditions as in Example 1, a mixture of a green tea extract and a repurified product of a concentrate of a green tea extract was treated with a cation exchange resin to obtain a solution. The amount of the resin was set at 0.5 wt. % based on the final beverage product. The thus-obtained solution was diluted and pH was adjusted to 6.4 with sodium hydrogencarbonate, and it was diluted further to 8,000 g. Subsequent to UHT sterilization, the resulting solution was filled in PET bottles. The results of an analysis and evaluation on grouts, precipitates and refined taste of the resulting beverage are shown in Table 1.

Example 4

Green tea leaves (135 g) from Shizuoka were added to deionized water (4 kg) which had been heated to 75° C., followed by extraction for 5 minutes. The tea leaves were then removed from the extract, and the extract was cooled to 25° C. or lower by a heat exchanger. By flannel filtration, precipitates and suspended matters were then removed from the extract. In the same manner as in Example 2, the thus-prepared extract was mixed with a repurified product of a concentrate of a green tea extract. The resultant solution was allowed to pass through a column packed with a cation exchange resin ("Diaion SK-1B") at room temperature. The amount of the resin was set at 0.05 wt. % based on the final beverage product. Subsequently, the extract was filtrated through a disc-shaped depth filter ("Zeta Plus 10C"). Subsequent to dilution, pH of the extract was adjusted to 6.4 with sodium hydrogencarbonate, and it was diluted further to 8,000 g. Subsequent to UHT sterilization, the resulting solution was filled in PET bottles. The results of an analysis and evaluation on grouts, precipitates and refined taste of the resulting beverage are shown in Table 1.

Example 5

A flannel filtrate of a green tea extract was obtained under the same conditions as in Example 1. To the flannel filtrate (2,900 g), a commercially-available concentrate ("Polyphenon HG", product of Mitsui Norin Co., Ltd.) of a green tea extract was added such that the concentration of the non-polymer catechins is 0.18 wt. % in the final product. The resulting mixture was then allowed to pass through a column packed with a cation exchange resin ("Diaion SK-1B") at room temperature. The amount of the resin was set at 1.4 wt. % based on the final beverage product. The thus-obtained solution was filtrated through a disc-shaped depth filter ("Zeta Plus 10C"). Subsequent to dilution, the pH of the solution was adjusted to 6.4 with sodium hydrogencarbonate, and it was diluted further to 8,000 g. Subsequent to UHT sterilization, the resulting solution was filled in PET bottles.

The results of an analysis and evaluation on grouts, precipitates and refined taste of the resulting beverage are shown in Table 1.

Example 6

A flannel filtrate of a green tea extract was obtained under the same conditions as in Example 1. The flannel filtrate (2,900 g) was allowed to pass through a column packed with a cation exchange resin ("Diaion SK-1B") at room temperature. The amount of the resin was set at 0.2 wt. % based on the final beverage product. Subsequently, the extract was filtrated through a disc-shaped depth filter ("Zeta Plus 10C"). To the filtrate, a repurified product of a commercially-available concentrate of a green tea extract as obtained under the same conditions as in Example 1 was added such that the concentration of the non-polymer catechins is 0.09 wt. % in the final product. The pH of the resulting mixture was adjusted to 6.2 with sodium hydrogencarbonate, and it was diluted further to 8,000 g. Subsequent to UHT sterilization, the resulting solution was filled in PET bottles. The results of an analysis and evaluation on grouts, precipitates and refined taste of the resulting beverage are shown in Table 1.

Example 7

A flannel filtrate of a green tea extract was obtained under the same conditions as in Example 1. To the solution (2,900 g), a repurified product of a commercially-available concentrate of a green tea extract obtained under the same conditions as in Example 1 was added such that the concentration of the non-polymer catechins is 0.12 wt. % in the final product. The resulting mixture was then allowed to pass through a column packed with a cation exchange resin ("Diaion SK-1B") at room temperature. The amount of the resin was set at 0.5 wt. % based on the final beverage product. The thus-obtained solution was filtrated through a disc-shaped depth filter ("Zeta Plus 10C"). Subsequent to dilution, the pH of the solution was adjusted to 6.2 with sodium hydrogencarbonate, and it was diluted further to 8,000 g. Subsequent to UHT sterilization, the resulting solution was filled in PET bottles. The results of an analysis and evaluation on grouts, precipitates and refined taste of the resulting beverage are shown in Table 1.

Comparative Example 1

A flannel filtrate of a green tea extract was obtained under the same conditions as in Example 1. The solution (2,900 g) was filtrated through a disc-shaped depth filter ("Zeta Plus 10C"), and a repurified product of a commercially-available concentrate of a green tea extract obtained under the same conditions as in Example 1 was added such that the concentration of the non-polymer catechins is 0.18 wt. % in the final product. Subsequent to dilution, the pH of the resulting solution was adjusted to 6.4 with sodium hydrogencarbonate, and it was diluted further to 8,000 g. Subsequent to UHT sterilization, it was filled in PET bottles. The results of an analysis and evaluation on grouts, precipitates and refined taste of the resulting beverage are shown in Table 1.

Comparative Example 2

A solution was obtained by treating a green tea extract with a cation exchange resin ("Diaion SK-1B) under the same conditions as in Example 1. The amount of the resin was set at 0.5 wt. % based on the final beverage product. The resulting solution (2,900 g) was filtered through a disc-shaped depth filter ("Zeta Plus 10C"), and a commercially-available concentrate ("Polyphenon 70S", product of Mitsui Norin Co., Ltd.) of a green tea extract was added such that the concentration of the non-polymer catechins is 0.18 wt. % in the final product. Subsequent to dilution, the pH of the solution was adjusted to 6.4 with sodium hydrogencarbonate, and it was diluted further to 8,000 g. Subsequent to UHT sterilization, The resulting solution was filled in PET bottles. The results of an analysis and evaluation on grouts, precipitates and refined taste of the resulting beverage are shown in Table 1.

Comparative Example 3

A flannel filtrate of a green tea extract was obtained under the same conditions as in Example 1. To the solution (2,900 g), a commercially-available concentrate ("Polyphenon HG", product of Mitsui Norin Co., Ltd.) of a green tea extract was added such that the concentration of the non-polymer catechins is 0.06 wt. % in the final product. The resulting mixture was then allowed to pass through a column packed with a cation exchange resin ("Diaion SK-1B") at room temperature. The amount of the resin was set at 0.5 wt. % based on the final beverage product. The thus-obtained solution was filtrated through a disc-shaped depth filter ("Zeta Plus 10C"). Subsequent to dilution, the pH of the solution was adjusted to 6.2 with sodium hydrogencarbonate, and it was diluted further to 8,000 g. Subsequent to UHT sterilization, the solution was filled in PET bottles. The results of an analysis and evaluation on grouts, precipitates and refined taste of the resulting beverage are shown in Table 1.

Comparative Examples 4-5

A flannel filtrate of a green tea extract was obtained under conditions similar to that described in Example 1 except for the stirring pattern for extraction. To a solution (2,900 g) which had been obtained by filtrating the above-described flannel filtrate through a disc-shaped depth filter ("Zeta Plus 10C"), a repurified product of a commercially-available concentrate of a green tea extract obtained under the same conditions as in Example 1 was added such that the concentration of the non-polymer catechins is 0.18 wt. % in the final product. The pH of the solution was adjusted to 6.4 with sodium hydrogencarbonate, then diluted to 8,000 g. Subsequent to UHT sterilization, the resulting solution was filled in PET bottles. The results of an analysis and evaluation on grouts, precipitates and refined taste of the resulting beverage are shown in Table 1.

Comparative Example 6

A flannel filtrate of a green tea extract was obtained under the same conditions as in Example 1. To a solution (2,900 g) which had been obtained by filtrating the above-described flannel filtrate to pass through a disc-shaped depth filter ("Zeta Plus 60C"), a repurified product of a commercially-available concentrate of a green tea extract obtained under the same conditions as in Example 1 was added such that the concentration of the non-polymer catechins is 0.18 wt. % in the final product. The solution was diluted, and the pH of the solution was adjusted to 6.4 with sodium hydrogencarbonate, and the resulting solution was further diluted to 8,000 g. Subsequent to UHT sterilization, it was filled in PET bottles. The results of an analysis and evaluation on grouts, precipitates and refined taste of the resulting beverage are shown in Table 1.

Comparative Example 7

A flannel filtrate of a green tea extract was obtained under the same conditions as in Example 1. A 14 wt. % part of the solution was allowed to pass through a column packed with a cation exchange resin ("Diaion SK-1B") at room temperature. The amount of the resin was set at 0.05 wt. % based on the final beverage product. The thus-treated solution was combined with the rest of 86 wt. % of the solution which remained untreated with the ion exchange. The thus-combined solution was filtrated through a disc-shaped depth filter ("Zeta Plus 10C"). To the resultant filtrate (2,900 g), a repurified product of a commercially-available concentrate of a green tea extract as obtained under the same conditions as in Example 1 was added such that the concentration of the non-polymer catechins is 0.18 wt. % in the final product. The solution was diluted, and the pH of the solution was adjusted to 6.4 with sodium hydrogencarbonate, and the resulting solution was further diluted to 8,000 g. Subsequent to UHT sterilization, the resulting solution was filled in PET bottles. The results of an analysis and evaluation on grouts, precipitates and refined taste of the resulting beverage are shown in Table 1.

TABLE 1

| | (A) Non-polymer catechins [mg/L] | (B) Concentration of Mg [mg/L] | (C) Content of water-insoluble solid particles sized from 0.2 to 0.8 μm [mg/L] | Satisfaction/ dissatisfaction of the inequality (1) | Grouts and precipitates after stored at 55° C. for 5 days | Refined taste |
|---|---|---|---|---|---|---|
| Example 1 | 1836 | 2.4 | 48 | Satisfied | − | A |
| Example 2 | 1814 | 0.3 | 54 | Satisfied | − | A |
| Example 3 | 1775 | 0.2 | 85 | Satisfied | − | A |
| Example 4 | 1798 | 6.2 | 40 | Satisfied | − | A |
| Example 5 | 1787 | 0.3 | 114 | Satisfied | ± | A |
| Example 6 | 953 | 1.2 | 35 | Satisfied | − | A |
| Example 7 | 1256 | 0.0 | 36 | Satisfied | − | A |
| Comp. Ex. 1 | 1845 | 8.9 | 58 | Dissatisfied | ++ | A |
| Comp. Ex. 2 | 1763 | 0.1 | 14 | Dissatisfied | − | B |
| Comp. Ex. 3 | 702 | 0.1 | 155 | Dissatisfied | + | A |
| Comp. Ex. 4 | 1720 | 8.0 | 48 | Dissatisfied | + | A |
| Comp. Ex. 5 | 1740 | 7.2 | 50 | Dissatisfied | + | A |
| Comp. Ex. 6 | 1670 | 7.6 | 19 | Dissatisfied | −± | B |
| Comp. Ex. 7 | 1810 | 6.6 | 72 | Dissatisfied | + | A |

In Examples 1-4, 6 and 7, neither grouts nor precipitates were observed even after the accelerated storage, and a refined taste was retained well. In Example 5, small grouts were slightly formed but disappeared immediately, so the external appearance of the beverage was not harmed, and a refined taste was retained as well. Compared with the above, large grouts and precipitates were formed abundantly in Comparative Example 1. In Comparative Examples 2 and 6, neither grouts nor precipitates were formed but an artificial sharp bitterness was tasted, so that the beverages were disagreeable for drinking. In Comparative Examples 3-5 and 7, grouts and precipitates were formed.

Example 8

Green tea leaves (135 g) from Miyazaki were added to deionized water (4 kg) which had been heated to 65° C., followed by extraction for 5 minutes. The tea leaves were then removed from the extract, and the extract was cooled to 25° C. or lower by a heat exchanger. By flannel filtration, precipitates and suspended matters were then removed from the extract. The extract was then allowed to pass through a column packed with a gel-type cation exchange resin (37.5 g; "Diaion SK-1B") at room temperature. Subsequently, the extract was filtrated through a disc-shaped depth filter ("Zeta Plus 10C"). On the other hand, a commercially-available concentrate (100 g; "Polyphenon HG", product of Mitsui Norin Co., Ltd.) of a green tea extract was dispersed in 99.5 wt. % ethanol (630 g), to which water (270 g) was added dropwise over 10 minutes subsequently. The resulting mixture was allowed to age for 30 minutes. The mixture was then filtrated through No. 2 filter paper and a filter paper having 0.2 µm pore size, and water (200 mL) was added. The thus-prepared mixture was concentrated under reduced pressure and then lyophilized to obtain a repurified product. The repurified product was added to the extract obtained in the above. The results of an analysis of the thus-obtained tea extract and the results of the evaluation on grouts and precipitates of a green tea beverage, in which 30 wt. % of the extract was added, are shown in Table 2.

Example 9

A flannel filtrate of a green tea extract was obtained under the same conditions as in Example 8. To the flannel filtrate, a repurified product of a commercially-available concentrate of a green tea extract as obtained under the same conditions as in Example 8 was added. The resulting mixture was then allowed to pass through a column packed with a gel-type cation exchange resin (75 g; "Diaion SK-1B") at room temperature. The amount of the resin was set at 0.5 wt. % based on the final beverage product. The thus-obtained solution was filtrated through a disc-shaped depth filter ("Zeta Plus 10C"). The results of analyses of the thus-obtained tea extract and the evaluation on grouts and precipitates of a green tea beverage, in which 30 wt. % of the extract was added, are shown in Table 2.

Example 10

Green tea leaves (135 g) from Shizuoka were added to deionized water (3.4 kg) which had been heated to 75° C., followed by extraction for 5 minutes. The tea leaves were then removed from the extract, and the extract was cooled to 25° C. or lower by a heat exchanger. By flannel filtration, precipitates and suspended matters were then removed from the extract. In a similar manner as in Example 9, the thus-prepared extract was mixed with a repurified product of a concentrate of a green tea extract. The resultant solution was allowed to pass through a column packed with a gel-type cation exchange resin (75 g; "Diaion SK-1B") at room temperature. Subsequently, the extract was filtrated through a disc-shaped depth filter ("Zeta Plus 10C"). The results of an analysis of the thus-obtained tea extract and the evaluation on grouts and precipitates of a green tea beverage, in which 30 wt. % of the extract was added, are shown in Table 2.

Comparative Example 8

A flannel filtrate of a green tea extract was obtained under the same conditions as in Example 8. The solution was filtrated through a disc-shaped depth filter ("Zeta Plus 10C"), and a repurified product of a commercially-available concentrate of a green tea extract obtained under the same conditions as in Example 8 was added. The results of an analysis of the thus-obtained tea extract and the evaluation on grouts and precipitates of a green tea beverage, in which 30 wt. % of the extract was added, are shown in Table 2.

Comparative Example 9

A flannel filtrate of a green tea extract was obtained under the same conditions as in Example 8. To the solution, a commercially-available concentrate ("Polyphenon HG", product of Mitsui Norin Co., Ltd.) of a green tea extract was added. The resulting mixture was then allowed to pass through a column packed with a gel-type cation exchange resin (37.5 g; "Diaion SK-1B") at room temperature. The results of an analysis of the thus-obtained tea extract and the evaluation on grouts and precipitates of a green tea beverage, in which 30 wt. % of the extract was added, are shown in Table 2.

Comparative Example 10

A flannel filtrate of a green tea extract was obtained under the same conditions as in Example 8. The filtrate was then allowed to pass through a column packed with a porous cation exchange resin (37.5 g; "Diaion PK-208") at room temperature. Subsequently, the extract was filtrated through a disc-shaped depth filter ("Zeta Plus 10C"), and a repurified product of a commercially-available concentrate of a green tea extract as obtained under the same conditions as in Example 8 was added. The results of an analysis of the thus-obtained tea extract and the evaluation on grouts and precipitates of a green tea beverage, in which 30 wt. % of the extract was added, are shown in Table 2.

TABLE 2

|  | Content of water-insoluble solids of from 0.2 to 0.8 μm [mg/L] | Concentration of Mg [mg/L] | Non-polymer catechins [mg/L] | Yield of non-polymer catechins in cation exchange resin treatment step [%] | Grouts and precipitates in green tea beverage after storage at 55° C. for 5 days |
|---|---|---|---|---|---|
| Example 8 | 97 | 5.0 | 5692 | 98.9 | − |
| Example 9 | 109 | 0.9 | 5442 | 98.5 | − |
| Example 10 | 158 | 0.8 | 5360 | 99.5 | − |
| Comp. Ex. 8 | 95 | 25.5 | 5550 | — | ++ |
| Comp. Ex. 9 | 207 | 0.9 | 5460 | 98.5 | ++ |
| Comp. Ex. 10 | 96 | 5.2 | 4982 | 88.8 | − |

Evaluation on grouts and precipitates:
−: Neither grouts nor precipitates were formed.
±: Small grouts were slightly formed but immediately disappeared when the beverage in the container was caused to move
+: Small grouts and precipitates were formed a little.
++: Large grouts and precipitates were formed abundantly.

In Examples 8-10, neither grouts nor precipitates were observed even after the accelerated storage, and a refined taste was retained well. In Comparative Examples 8-9, on the other hand, large grouts and precipitates were formed abundantly. In Comparative Example 10, neither grouts nor precipitates were formed, but the yield of the non-polymer catechins in the cation exchange resin treatment step dropped significantly.

The invention claimed is:

1. A packaged tea beverage comprising:
   (A) from 0.05 to 0.5 wt. % of non-polymer catechins,
   (B) magnesium, and
   (C) water-insoluble solid particles sized from 0.2 to 0.8 μm,
wherein the following inequality is satisfied:

$$20 < (C) < -13 \times (B) + 140$$

and (B) and (C) indicate the content (mg/L) of said ingredient (B) and ingredient (C) respectively.

2. The packaged tea beverage according to claim 1, which is obtained by adding
   an extract of a tea material selected from the group consisting of green tea, semi-fermented tea and fermented tea; and
   a concentrate or purified product of green tea extract.

3. The packaged tea beverage according to claim 2, wherein upon addition of said extract of said tea material and said concentrate or purified product of a green tea extract, one or a mixture of said extract and said concentrate or purified product is brought into contact with a cation exchange resin.

4. The packaged tea beverage according to claim 3, wherein said cation exchange resin is used in an amount of from 0.05 to 3 wt. % based on said extract of said tea material, said concentrate or purified product, or said mixture thereof.

5. The packaged tea beverage according to claim 3 or 4, wherein said cation exchange resin is a gel-type cation exchange resin.

6. The packaged tea beverage according to claim 1, which is a green tea beverage.

7. The beverage according to claim 1, wherein from 0.12 to 0.30 wt. % of non-polymer catechins are present.

8. The beverage according to claim 1, wherein the magnesium is present in an amount of from greater than 0 to 9.2 mg/L.

9. The beverage according to claim 1, wherein the water-insoluble solid particles sized from 0.2 to 0.8 μm are present in an amount greater than 20 mg/L.

10. The beverage according to claim 1, wherein the following inequality is also satisfied:

$$20 < (C) < -8.7 \times (B) + 100$$

and (B) and (C) indicate the content (mg/L) of said ingredient (B) and ingredient (C) respectively.

11. The beverage according to claim 1, wherein the pH is from 2 to 7 at 25° C.

12. The beverage according to claim 4, wherein the cation exchange resin is used in an amount of from 0.5 to 2 wt. % based on said extract of said tea material, said concentrate or purified product, or said mixture thereof.

* * * * *